United States Patent [19]

Murray

[11] 4,198,017
[45] Apr. 15, 1980

[54] CONTROL AUGMENTATION SYSTEM FOR FLIGHT VEHICLES

[75] Inventor: James B. Murray, New Brighton, Minn.

[73] Assignee: The United States of America as represented by the Secretary of the Army, Washington, D.C.

[21] Appl. No.: 951,201

[22] Filed: Oct. 13, 1978

[51] Int. Cl.² .............................................. B64C 13/04
[52] U.S. Cl. .............................. 244/83 G; 244/17.13; 244/178; 364/434
[58] Field of Search ................ 244/17.13, 178, 83 G, 244/83 H; 318/628, 610; 364/434, 116

[56] References Cited

U.S. PATENT DOCUMENTS

| | | | |
|---|---|---|---|
| 3,175,786 | 3/1965 | Frank | 244/178 |
| 3,711,042 | 1/1973 | Rempfer | 244/17.13 |
| 3,733,039 | 5/1973 | O'Connor | 244/17.13 |
| 4,109,886 | 8/1978 | Tribken | 244/17.13 |

Primary Examiner—Trygve M. Blix
Assistant Examiner—Reinhard J. Eisenzopf
Attorney, Agent, or Firm—Nathan Edelberg; Frank Dynda; Sheldon Kanars

[57] ABSTRACT

A control augmentation system for stabilization and control of flight vehicles, wherein control of vehicle angular velocities in proportion to control input is effected, and where stabilization of the corresponding vehicle attitude is also effected. The system consists of both feedforward and feedback signal paths. The feedback paths provide augmentation of the vehicle's inherent stability. The feedforward paths augment the controllability factors available to the pilot. The control augmentation system is a solution to hingeless rotor control problems.

2 Claims, 4 Drawing Figures

CONTROL AUGMENTATION SYSTEM FOR FLIGHT VEHICLES

The invention described herein may be manufactured and used by or for the Government for governmental purposes without the payment of any royalties thereon or therefor.

BACKGROUND OF THE INVENTION

1. Field of the Invention

The present invention relates broadly to flight vehicle control systems and in particular to flight vehicle control augmentation systems for mechanical control gyro systems on helicopters.

2. Description of the Prior Art

This invention has general application to all flight vehicles wherein control of vehicle angular velocities in proportion to control input is desired and where stabilization of the corresponding vehicle attitude is also desired. This electronic control augmentation system (CAS) solves a stability problem occurring in a mechanical system system on the AH56A Cheyenne Helicopter.

The CAS consists of a hydro-mechanical primary flight control system (PFCS) operating with a full-time redundant electronic augmentation system.

SUMMARY OF THE INVENTION

This invention was developed specifically for application to helicopter control, but has general application to all flight vehicles wherein control of the vehicle angular velocities in proportion to control input is desired, and where stabilization of the corresponding vehicle attitude is also desired.

The systems, as illustrated in FIG. 1, consists of both feedforward and feedback signal paths. The feedback paths provide augmentation of the vehicle's inherent stability. The feedforward paths augment the controllability factors available to the pilot. The system can be separated into two parts, stability augmentation and control augmentation.

STABILITY AUGMENTATION

Two feedback paths, both driven by the rate gyro, augment stability. The combination of the two paths approximate a "rate plus attitude" stabilization system. As such, they provide many of the same functions of such a system without requiring a vehicle attitude sensor. Among these functions are:

Damping of vehicle short period dynamic modes;

Minimization of vehicle motions due to control inputs in other control axes;

Minimization of attitude excursions resulting from wind gust disturbances; and

When applied to the vehicle's pitching axis, damping of the phugoid oscillatory mode, and neutralizing speed stability (pitching due to airspeed charge).

CONTROL AUGMENTATION

The two feedforward paths are both driven by an electrical measurement of control stick position $\delta$. The primary path provies a means for the pilot to command vehicle rate in desired proportion to his control stick deflection. The secondary feedforward path serves to optimize handling qualities. The integration of the summed primary feedback and feedforward signals assues that in any steady condition when vehicle rate is zero, the stick deflection must also be zero. Hence, over a range of different operating conditions (airspeeds, altitudes, loadings) the stick will remain centered in steady state trimmed flight. The pilot is thereby relieved of the task of retrimming the control stick following speed, altitude or configuration changes.

AUXILIARY SYSTEMS

Other auxiliary devices may be desired or required to provide safe operation under other than normal flying conditions.

A manual trim feature described schematically by FIG. 2 allows the pilot to adjust the position of the control stick without applying force to the grip. When the control augmentation system is operative the manual parallel trim device has two functions:

(1) To allow adjustment of stick position such that zero vehicle rate can be obtained with a zero value of force applied to the stick.

(2) To allow pilot applied stick forces to be trimmed to zero in a steady state maneuver.

In addition, when the control augmentation system is inoperative, the manual trim device allows pilot forces to be trimmed to zero.

Automatic series trim may be a necessary element of the control augmentation system, depending on the trim characteristics of the vehicle. The schematic diagram in FIG. 3 described the system. The function of the trim system is to maintain the servo actuator near neutral in the long term. In some applications a stability problem may arise due to the vehicle motion resulting from the trimming action. This problem is solved by the stability compensation path with gain K.

This traim system is required in cases where control surface trim ranges are such that disengagement and recentering of the servo actuator would be unsafe, unless it were kept near center.

The airborne configuration of the control augmentation system is not suitable when the motions of the vehicle are constrained by its contact with the ground. Consequently, auxiliary devices are used to alter the configuration during ground contact. A ground handling system is illustrated in FIG. 4.

The ground handling system also densitizes the vehicle rate to the surface deflection paths. This prevents the feedback paths from commanding excessive control surface deflections during landing transients.

Another necessary ground handling provision is the deactivation of the automatic series trim while in ground contact to prevent unwanted control inputs from that source.

DESCRIPTION OF THE PREFERRED EMBODIMENT

In the interest of additional background information, conventional and generally widely known elements or devices will be mentioned without stating the exact nature of the device.

Figure 1:
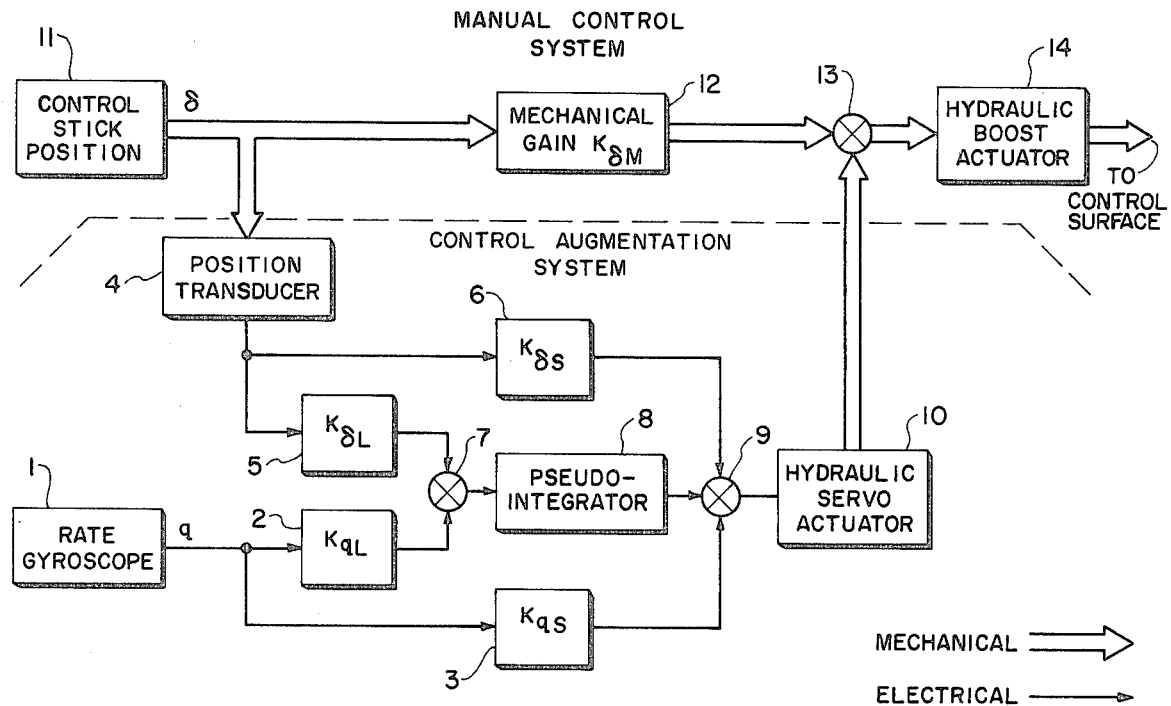
FIG. 1 is a functional block diagram of the control augmentation system.

Operation of the system is illustrated by the block diagram in FIG. 1. The system consists of both feedforward and feedback signal paths. The feedback paths provide augmentation of the vehicle's inherent stability. The feedforward paths augment the controllability factors available to the pilot.

Two feedback paths 2 and 3, both driven by the rate gyro 1, augment stability. The primary path 2, with a gain $K_{qL}$, contains a pseudo-integrator 8, which is a lag filter having a large time constant. In effect, the output of this channel approximates the time integral of the rate gyro output, or the attitude of the vehicle. The second feedback path 3, with gain $K_{qS}$ is a pure vehicle rate feedback. The combination of the two paths approximate a "rate plus attitude" stabilization system. As such, they provide many of the same functions of such a system without requiring a vehicle attitude sensor. Among these functions are:

Damping of vehicle short period dynamic modes;

Minimization of vehicle motions due to control inputs in other control axes;

Minimization of attitude excursions resulting from wind gust disturbances; and

When applied to the vehicle's pitching axis, damping of the phugoid oscillatory mode, and neutralizing speed stability (pitching due to airspeed change).

The two feedforward paths 5 and 6 are both driven by the output of a stick position $\delta$, transducer 4. The primary path 5, with gain $K_{\delta L}$ sums with the primary feedback signal 2 before being operated on by the pseudo-integrator 8. This path provides a means for the pilot to command vehicle rate in desired proportion to his control stick deflection. The ratio of gains $K_{\delta L}K_{qL}$ determines the amount of rate commanded by a stick deflection in steady state. The secondary feedforward path 6 serves to shape the short term response of rate to stick deflection so as to optimize handling qualities. The phasing and gain of the path can be designed to either add to or subtract from the gain of the mechanical control path $K_{\delta M}(12)$ by means of summer 13 to provide the desired response.

The integration of the summed primary feedback and feedforward signals produce a desirable result in terms of vehicle trim. The integration assures that the sum will be equal to zero in steady state. This means that in any steady condition when vehicle rate is zero, the stick deflection must also be zero. Hence, over a range of different operating conditions (airspeeds, altitudes, loadings) the stick will remain centered in steady state trimmed flight. The pilot is thereby relieved of the task of retrimming the control stick following speed, altitude, or configuration changes.

AUXILIARY DEVICES

The foregoing describes the system in its basic form. Certain other auxiliary devices may be required to provide safe operation under other than normal flying conditions. These devices and their relationships to the base system are:

Manual Parallel Trim

Figure 2:
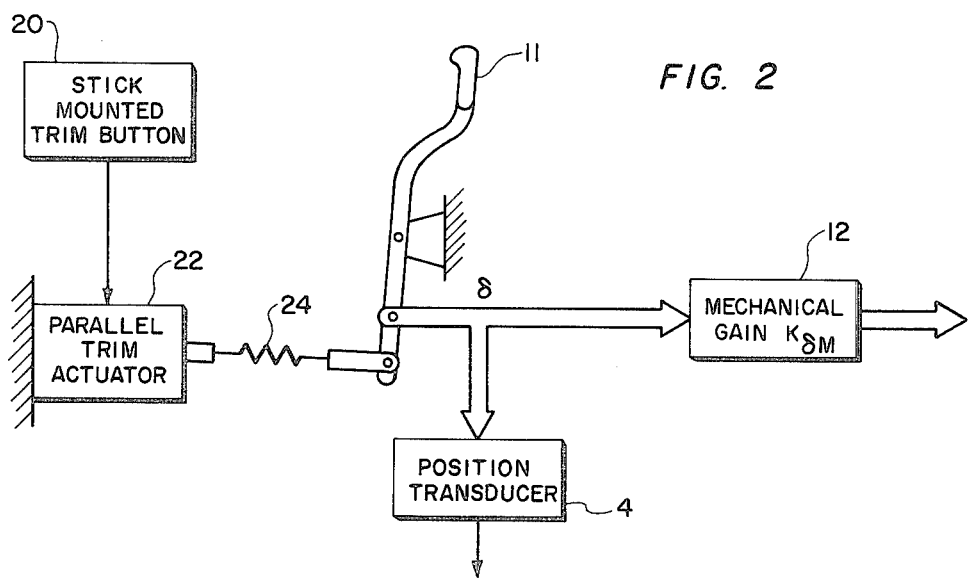
FIG. 2 is a functional block diagram of a manual parallel trim feature.

The manual trim feature described schematically by FIG. 2 allows the pilot to adjust the position of the control stick without applying force to the grip. The manual trim consists of an electric motor 22 coupled to the control stick 11 through a feel spring 24. The motor is activated by a trim button 20 mounted on the control column and runs at constant speed as long as the button is depressed. When the control augmentation system is operative the manual trim device has two functions:

(1) To allow adjustment of stick position such that zero vehicle rate can be obtained with a zero value of force applied to the stick.

(2) To allow pilot applied stick forces to be trimmed to zero in a steady state maneuver.
In addition, when the control augmentation system is inoperative, the manual trim device allows pilot forces to be trimmed to zero.

Automatic Series Trim

Figure 3:
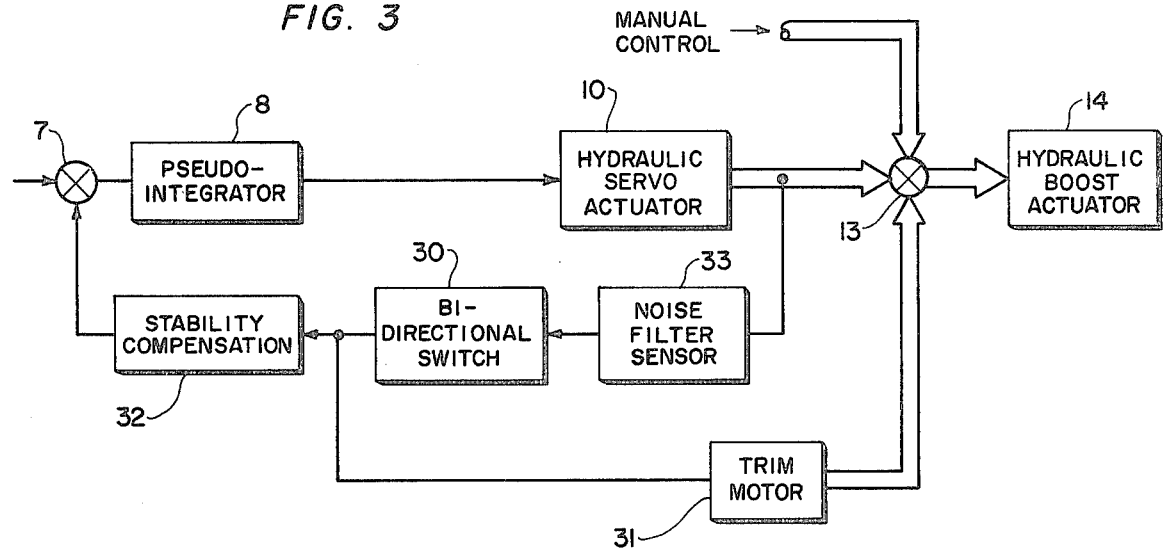
FIG. 3 is a functional block diagram of an automatic series trim feature.

Automatic series trim may be a necessary element of the control augmentation system, depending on the trim characteristics of the vehicle. The schematic diagram in FIG. 3 describes the system. The function of the trim system is to maintain the servo actuator 10 near neutral in the long term. The system senses hydraulic servo actuator displacement through a noise filter 33, and through a bi-directional switch with deadband and hysteresis, operates the trim motor 31. The trim motor motion adds to the servo actuator output, causing some control surface and vehicle motion. The vehicle motion feeds back through the augmentation system and drives the servo actuator toward center. In some applications a stability problem may arise due to the vehicle motion resulting from the trimming action. This problem is solved by the stability compensation path 32 with gain K. The gain can be set such that the servo actuator retracts at nearly the same rate as the trim motor is extending. The net boost actuator and vehicle motions are then essentially zero.

This trim system would be applied in cases where control surface trim ranges are such that disengagement and recentering of the servo actuator would be unsafe, unless it were kept near center.

Ground Handling Provision

Figure 4:
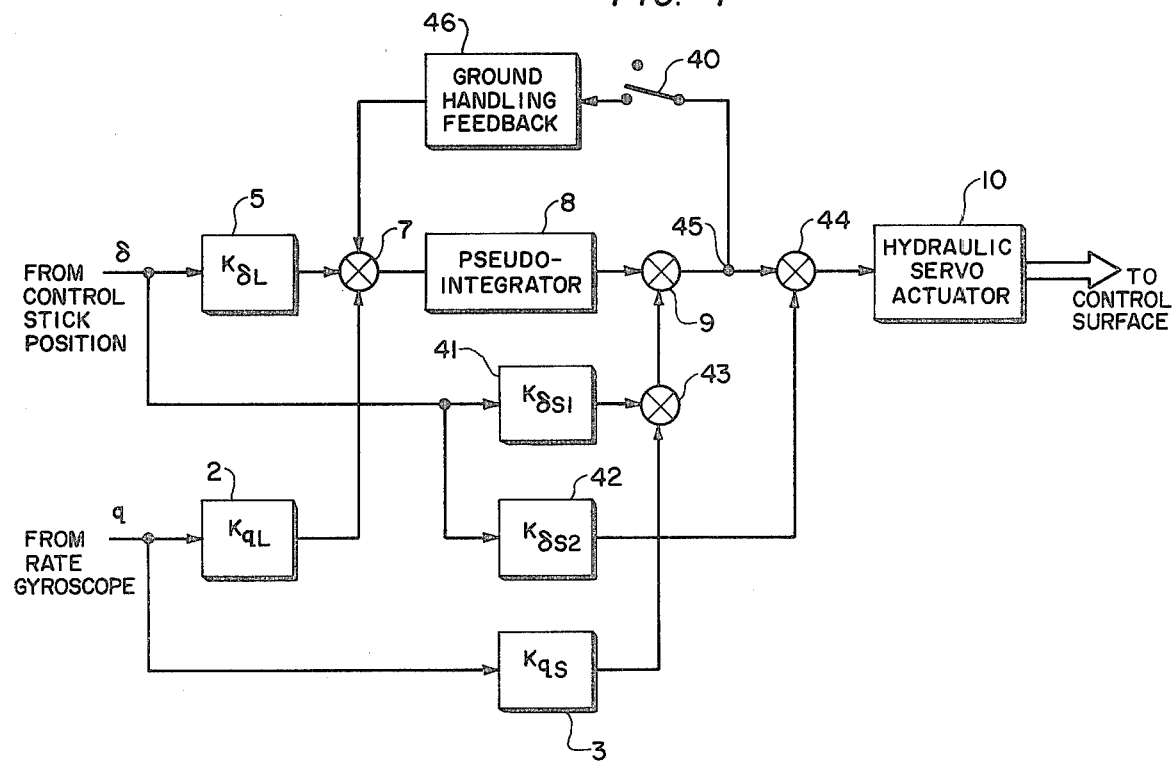
FIG. 4 is a functional block diagram of a ground handling provision.

The airborne configuration of the control augmentation system is not suitable when the motions of the vehicle are constrained by its contact with the ground. Consequently, auxiliary devices are used to alter the configuration during ground contact. One of the ground handling devices is illustrated in FIG. 4. Since contact with the ground precludes the normal response of vehicle rate to stick deflection, the primary system feedback is essentially open. As a result, control surface response to stick deflection becomes very large. To reduce this sensitivity to a reasonable level, the ground handling feedback switch 40 shown in FIG. 4 is closed during ground contact. Ground contact can be sensed by measuring the level of reaction force exerted by the vehicle landing gear against the ground. In most applications, the deflection of landing gear shock absorbers will provide this information. In addition, it may be desirable in some applications to split the secondary feedforward path 6 $K_{\delta S}$ into two paths $K_{\delta S1}(41)$ and $K_{\delta S2}(42)$.

The path $K_{\delta S2}(42)$ summing downstream of the ground feedback pickoff 45 is used to cancel some or all of the mechanical system gain. By this means it is possible to achieve an overall sensitivity which is less than that of the mechanical system.

The ground handling feedback also desensitizes the vehicle rate to surface deflection paths. This prevents the feedback paths from commanding excessive control surface deflections during landing transients.

The ground handling feedback contains a dual valued lag filter 46. The primary purpose of the filter is to smooth the switching transients which can occur at takeoff. While the air/ground switch is closed, the time constant of the filter is very small, allowing the feedback path to respond quickly when the ground is contacted. Conversely, when the switch is opened, the filter time constant becomes large, allowing the charge stored in the filter to decay slowly, smoothing the transition from ground to airborne operation.

Another necessary ground handling provision is the deactivation of the automatic series trim while in ground contact to prevent unwanted control inputs from that source.

What is claimed is:

1. In a flight control system including a control stick, a mechanical gain means, a hydraulic boost actuator, and a control augmentation system including a rate gyroscope having an output, a first feedback path having a gain $K_{ql}$ driven by said rate gyroscope output, a second feedback path having a gain $K_{qs}$ driven by said rate gyroscope output, a control stick position transducer having an output, a first feedforward path having a gain $K_{\delta l}$ driven by said control stick position transducer output, a second feedforward path having a gain $K_{\delta s}$ driven by said control stick position transducer output, a first summing means for summing the outputs of said first feedback path and said first feedforward path, a pseudo-integrator means including an output driven by the output of said first summing means, a second summing means for summing the output of said psuedo-integrator, said second feedback path and said second feedforward path, and a servo actuator means for receiving the output of said second summing means for augmenting the mechanical gain of said flight vehicle whereby control of flight vehicle angular velocities in proportion to control input and stabilization of flight vehicle attitude is effected, an automatic series trim system comprising:
   (a) a hydraulic servo actuator displacement sensor;
   (b) a bi-directional switch;
   (c) a trim motor, and
   (d) a stability compensation path with gain K; wherein said system measures said hydraulic actuator displacement, and through said bi-directional switch operates said trim motor, whereby said trim motor adds to the output of said servo actuator causing control surface and vehicle motion.

2. The flight control system of claim 1 including a ground handling system comprising:
   (a) a ground contact sensing switch;
   (b) a ground handling feedback path including a dual valued lag filter;
   (c) a split secondary feedforward path $K_{\delta S}$, including paths $K_{\delta S1}$, and $K_{\delta S2}$;
   (d) a ground feedback pickoff point;
   (e) a summing means downstream of said ground feedback pickoff which cancels some or all of said mechanical system gain and wherein said ground handling feedback path desensitizes the vehicle rate to surface deflection paths thereby preventing said feedback paths from commanding excessive control surface deflections during landing transients.

* * * * *